US009368974B2

(12) United States Patent
Silberberg et al.

(10) Patent No.: US 9,368,974 B2
(45) Date of Patent: Jun. 14, 2016

(54) EFFICIENT AND ROBUST WIRELESS ENERGY TRANSFER

(75) Inventors: Yaron Silberberg, LeHavim (IL); Haim Suchowski, Rehovot (IL); Nikolay V. Vitanov, Rehovot (IL); Andon A. Rangelov, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 927 days.

(21) Appl. No.: 13/582,512

(22) PCT Filed: Mar. 3, 2011

(86) PCT No.: PCT/IL2011/000214
§ 371 (c)(1),
(2), (4) Date: Sep. 4, 2012

(87) PCT Pub. No.: WO2011/107995
PCT Pub. Date: Sep. 9, 2011

(65) Prior Publication Data
US 2012/0319498 A1    Dec. 20, 2012

Related U.S. Application Data

(60) Provisional application No. 61/310,312, filed on Mar. 4, 2010.

(51) Int. Cl.
*H02J 5/00*    (2016.01)

(52) U.S. Cl.
CPC .................... *H02J 5/005* (2013.01)

(58) Field of Classification Search
CPC .......................................... H02J 5/005
USPC ............................................. 307/104
See application file for complete search history.

(56) References Cited

U.S. PATENT DOCUMENTS

| 2008/0278264 | A1 | 11/2008 | Karalis et al. |
| 2009/0322307 | A1 | 12/2009 | Ide |
| 2010/0045114 | A1 | 2/2010 | Sample et al. |
| 2010/0148589 | A1* | 6/2010 | Hamam ............... H04B 5/0037 307/104 |

FOREIGN PATENT DOCUMENTS

| CN | 101258658 | 9/2008 |
| WO | WO 2010/039967 | 4/2010 |
| WO | WO 2011/107995 | 9/2011 |

OTHER PUBLICATIONS

International Preliminary Report on Patentability Dated Oct. 26, 2012 from the International Bureau of WIPO Re. Application No. PCT/IL2011/000214.

(Continued)

*Primary Examiner* — Rexford Barnie
*Assistant Examiner* — Toan Vu

(57) ABSTRACT

A method or apparatus for wireless transferring energy between a source coil and a drain coil, comprises selling an initial resonant frequency of the source coil as a first condition; setting the source coil and said drain coil in positions relative to each other to define an initial coupling coefficient therebetween, so that the initial coupling coefficient comprises a second condition; and adiabatically changing one or both of the conditions while pumping energy into the source coil. The source coil energy is transferred to the drain coil over the course of the adiabatic change.

24 Claims, 14 Drawing Sheets

(56) References Cited

OTHER PUBLICATIONS

International Search Report and the Written Opinion Dated Sep. 7, 2012 from the International Searching Authority Re. Application No. PCT/IL2011/000214.

Hamam et al. "Efficient Weakly-Radiative Wireless Energy Transfer: An EIT-Like Approach", Annals of Physics, XP026236073, 324(8): 1783-1795, Aug. 1, 2009. p. 1784-1787, Figs.1, 2.

Notification of Office Action Dated Jul. 30, 2014 from the State Intellectual Property Office of the People's Republic of China Re. Application No. 201180018750.6 and its Translation Into English.

Search Report Dated Jul. 30, 2014 from the State Intellectual Property Office of the People's Republic of China Re. Application No. 201180018750.6 and its Translation Into English.

* cited by examiner

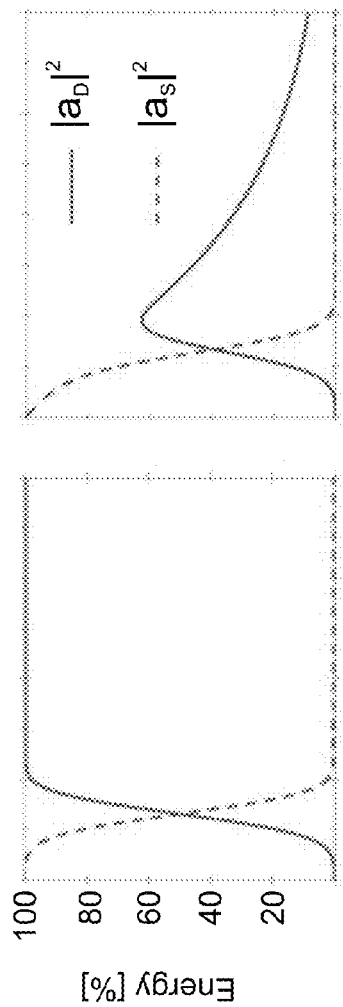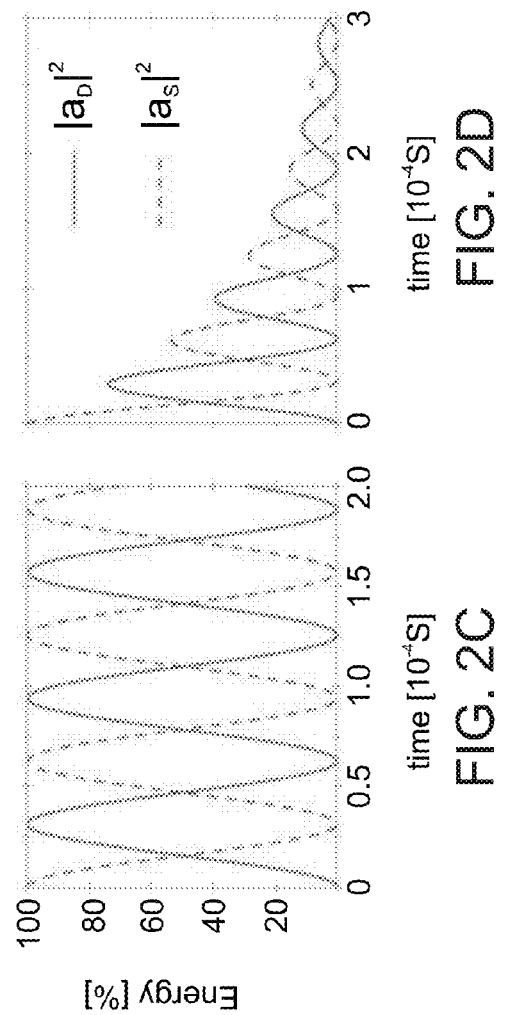

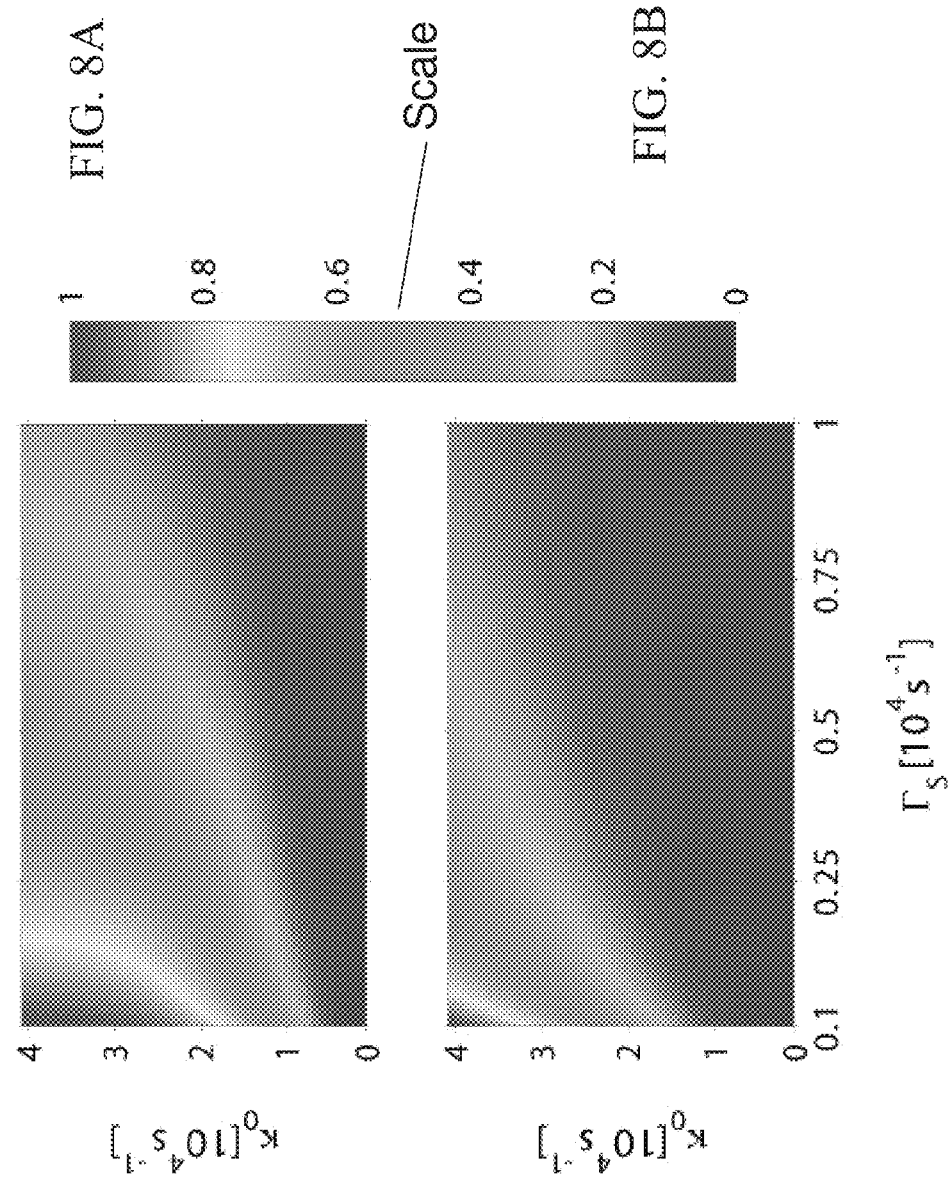

EFFICIENT AND ROBUST WIRELESS ENERGY TRANSFER

RELATED APPLICATIONS

This application is a National Phase of PCT Patent Application No. PCT/IL2011/000214 having International filing date of Mar. 3, 2011, which claims the benefit of priority under 35 USC §119(e) of U.S. Provisional Patent Application No. 61/310,312 filed on Mar. 4, 2010. The contents of the above applications are all incorporated by reference as if fully set forth herein in their entirety.

FIELD AND BACKGROUND OF THE INVENTION

The present invention relates to a device and method for wireless energy transfer.

The search for wireless power transfer techniques is as old as the invention of electricity. From Tesla, and through the vast technological development during the $20^{th}$ century, many suggestions have been proposed and implemented in this field of research. Established techniques of performing wireless energy transfer are known both in the near and far field coupling regimes. Near field examples can be found in optical waveguides, cavity couplers and in resonant inductive electric transformers. For the far field, one has power beaming mechanisms, where power is beamed at a receiver and is converted to usable electrical energy. These techniques, though they reach sufficiently high efficient energy transfer, suffer either from short range interaction (near field coupling), or from the requirement of line of sight in the far field approaches.

Recently, it has been shown that a weakly radiative wireless energy transfer scheme between two identical classical resonant objects is possible with sufficiently high efficiency. This possibility arises from employing coupled mode theory in the realm of power transfer. In this research Kurz et. al showed that wireless energy can be transferred efficiently over a 2 meter range, generally considered in this field as mid-range. This technique was adopted by others as well, where the transfer efficiency was increased tremendously from an efficiency of 40%, previously the best achieved for this range, to recently achieved values of around 75%, notably by Intel.

Currently, most efficient wireless energy transfer devices rely on a resonant constraint. Such a constraint typically means that when the frequency of the source is shifted from the frequency of the device, intentionally or due to random noise, a significant reduction of the efficiency of the wireless energy transfer would occur. Random noise may be the result of an external object being placed close to either of the coils When the resonance condition is violated, then one may need to provide a feedback circuit in order to avoid a possible reduction of the energy transfer.

SUMMARY OF THE INVENTION

In contrast to the above described sensitivity to noise and other interference in the neighborhood of the coils due to resonant energy transfer, the present embodiments provide a technique for robust and efficient mid-range wireless power transfer between two coils, by adapting the process of rapid adiabatic passage (RAP) for a coherently driven two-mode system, as is explained hereinbelow. The dynamic adiabatic solution is shown to be both efficient and robust for variation of the parameters driving the process, such as the resonant frequencies of the coils and the coupling coefficient variable.

According to one aspect of the present invention there is provided a method of transferring energy between a source coil and a drain coil, comprising:

setting an initial resonant frequency of the source coil as a first condition;

setting the source coil and the drain coil in positions relative to each other to define an initial coupling coefficient therebetween, the initial coupling coefficient comprising a second condition; and adiabatically changing at least one member of the group consisting of the first condition and the second condition while pumping energy into the source coil, thereby to transfer the pumped energy to the drain coil.

In an embodiment, both of the first condition and the second condition are adiabatically changed.

In an embodiment, the first condition is adiabatically changed. Alternatively, the second condition may be adiabatically changed.

In an embodiment, the source coil is part of a resonant circuit having variable components to allow the initial resonant frequency to be changed.

In an embodiment, the source and drain coils are mobile with respect to each other, thereby to allow changing of the initial coupling coefficient.

In an embodiment, at any given time of the adiabatic changing there is a detuning value, the detuning value being the difference between a current value of the resonant frequency of the source coil and the resonant frequency of the drain coil, the adiabatic changing providing a smooth time dependence of the coupling coefficient ($\kappa(t)$) and the detuning value ($\Delta(t)$).

In an embodiment, the adiabatic changing comprises fulfilling an adiabatic condition relating the coupling coefficient and the detuning value:

$$|\dot{\kappa}(t)\Delta(t)-\kappa(t)\dot{\Delta}(t)|<<[4\kappa^2(t)+\Delta^2(t)]^{3/2}.$$

In an embodiment, the coupling coefficient $\kappa(t)$ is relatively larger than a loss rate ($\Gamma$), and wherein an initial and a final detuning are both relatively larger than the coupling coefficient, ($\Gamma<\kappa<\Delta$).

An embodiment may involve varying the resonant frequency of the source coil such that a detuning value ($\Delta(t)$), the detuning value being a difference between the resonant frequency of the source coil and the resonant frequency of the drain coil, sweeps slowly from a negative value, the negative value being larger than the coupling between the source coil and the drain coil, to a positive value being larger than the coupling between the source coil and the drain coil.

An embodiment may involve modifying the changing to reduce an amount of time that energy is retained in the source coil.

An embodiment may involve varying the resonant frequency of the source coil by an amount of up to ten percent over a period of between one and three milliseconds.

An embodiment may involve varying the resonant frequency of the source coil by an amount of up to ten percent over a period exceeding two milliseconds.

An embodiment may involve varying the coupling coefficient over the period.

According to a second aspect of the present invention there is provided apparatus for transferring energy comprising:

a source coil having resonance variation circuitry for varying a resonant frequency of the source coil;

a position unit for varying a position or orientation of the source coil so as to vary a coupling coefficient of the source coil with a respective drain coil to which the source coil is wirelessly coupled;

and a controller configured to adiabatically vary at least one of the resonant frequency and the coupling coefficient while pumping energy into the source coil, thereby to transfer the pumped energy to the drain coil.

In an embodiment, both of the resonant frequency and the coupling coefficient are adiabatically changed.

In an embodiment, the resonant frequency is adiabatically changed.

In an embodiment, the coupling coefficient is adiabatically changed.

In an embodiment, the locating unit is operative to rotate the source coil, thereby to allow the adiabatic changing of the initial coupling coefficient.

In an embodiment, at any given time of the adiabatic changing there is a detuning value, the detuning value being the difference between a current value of the resonant frequency of the source coil and the resonant frequency of the drain coil, the adiabatic changing providing a smooth time dependence of the coupling coefficient ($\kappa(t)$) and the detuning value ($\Delta(t)$).

In an embodiment, the coupling coefficient $\kappa(t)$ is relatively larger than a loss rate ($r$), and wherein an initial and a final detuning are both relatively larger than the coupling coefficient, ($\Gamma<\kappa<\Delta$).

In an embodiment, the controller is configured to vary the resonant frequency of the source coil such that a detuning value ($\Delta(t)$), the detuning value being a difference between the resonant frequency of the source coil and the resonant frequency of the drain coil, sweeps slowly from a negative value, the negative value being larger than the coupling between the source coil and the drain coil, to a positive value being larger than the coupling between the source coil and the drain coil.

In an embodiment, the controller is operative to modifying the changing to reduce an amount of time that energy is retained in the source coil.

In an embodiment, the controller is operative to vary the resonant frequency of the source coil by an amount of up to ten percent over a period of between one and three milliseconds.

In an embodiment, the controller is operative to vary the resonant frequency of the source coil by an amount of up to ten percent over a period exceeding two milliseconds.

In an embodiment, the controller is operative to vary the coupling coefficient over the period.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof. This refers in particular to tasks involving setting transmission parameters.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 2A-2D are a series of graphs comparing energy transfer between two coils with and without the assistance of the present embodiments;

FIGS. 6, 7, 8A and 8B show contour plots of the efficiency coefficient η as a function of the coupling $\kappa_0$ and the decay rate of the source and the drain coils $\Gamma_D=\Gamma_S$;

DESCRIPTION OF THE PREFERRED EMBODIMENTS

The present embodiments comprise a technique for efficient and robust mid-range wireless power transfer between two coils, by adapting the process of rapid adiabatic passage for a coherently driven two-state atom to the realm of wireless energy transfer. This scheme may transfer energy between the coils without being sensitive to resonant constraints, noise and other interference that may exist in the neighborhood of the coils.

The present embodiments thus adapt coupling conditions adiabatically, the coupling conditions being for example the coupling coefficient and resonant frequency. The prior art of which applicant is aware, by contrast retains fixed coupling conditions.

The principles and operation of an apparatus and method according to the present invention may be better understood with reference to the drawings and accompanying description.

Figures 1A, 1B:
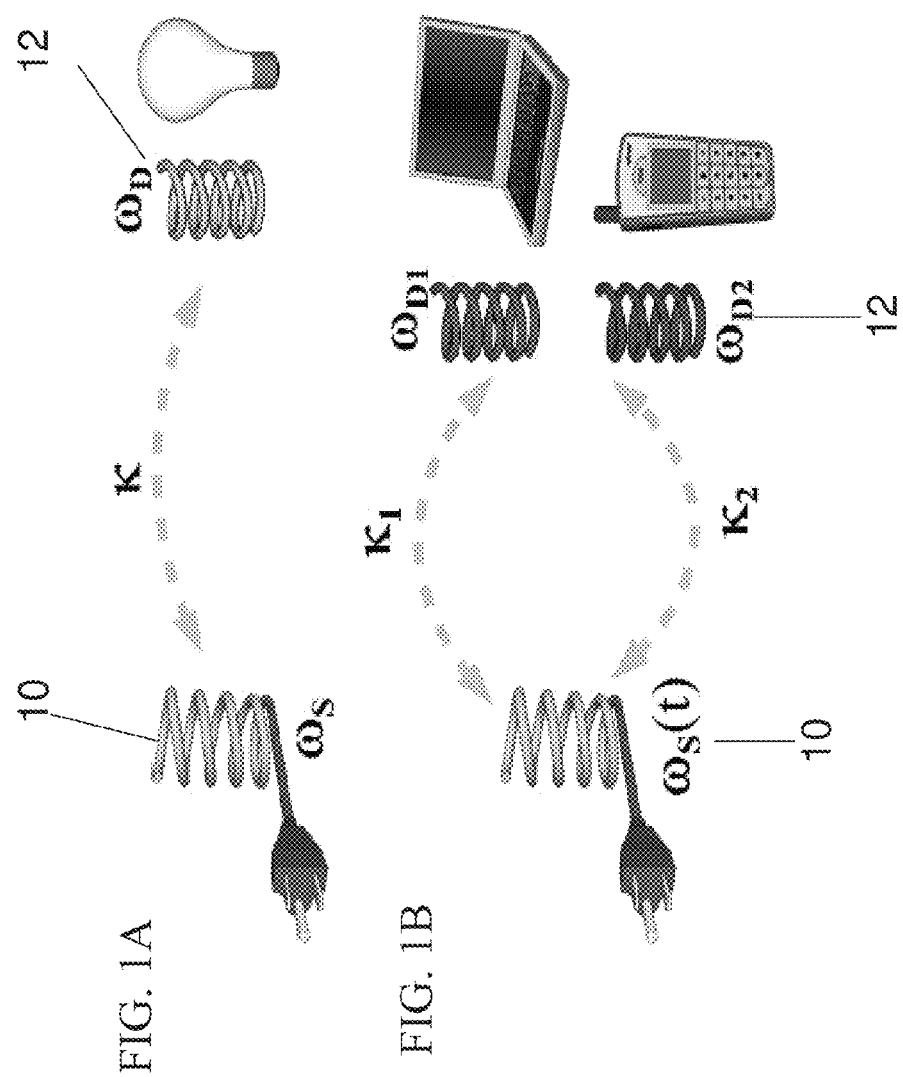
FIG. 1A is a simplified diagram illustrating a system for transferring power wirelessly over a two coil system to power a device, using a static resonant frequency according to the prior art.
FIG. 1B is a simplified diagram of a system for transferring power wirelessly over a two-coil system to power a device, using a resonant frequency or a coupling coefficient varying adiabatically with time according to a first embodiment of the present invention.

Before explaining at least one embodiment of the invention in detail, an overview is provided of two coupled mode theory and of the resonant solution, with reference to FIG. 1A. Two coupled mode theory is also referred to as the two state atom analogue.

Reference is now made to FIG. 1A, which illustrates two coils 10 and 12, which are designed for wireless energy transfer between them. The source coil 10 is part of a driving circuit and is periodically recharged, while the energy is transferred wirelessly to the device coil 12 across a space.

In FIG. 1a as implemented by the prior art resonance solution, efficient transfer from the source and the device may only occur when $\omega_S=\omega_D$. Otherwise, or for that matter in the presence of noise, energy transfer may be poor.

The interaction between the two coils, in the strong-coupling regime is described by the coupled-mode theory. In this process the following equation describes the dynamics of the two classical coils:

$$i\frac{d}{dt}\begin{bmatrix} a_S(t) \\ a_D(t) \end{bmatrix} = \begin{bmatrix} \omega_S(t) - i\Gamma_S & \kappa(t) \\ \kappa(t) & \omega_D(t) - i\Gamma_D - i\Gamma_W \end{bmatrix} \begin{bmatrix} a_S(t) \\ a_D(t) \end{bmatrix}, \quad (1)$$

where variables $a_S(t)$ and $a_D(t)$ are defined so that the energy contained in the source is $|a_S(t)|^2$ and the energy contained in the drain is $|a_D(t)|^2$, $\Gamma_S$ and $\Gamma_D$ are the intrinsic decay rates of the source and the drain coils respectively, decay being typically due to absorption and radiation losses. Work may be extracted from the device by means of the term $\Gamma_W$. The frequencies of the source and the drain coils are $\omega_S(t)$ and $\omega_D(t)$ and those are given explicitly as:

$$\omega_{S,D}(t) = 1/\sqrt{L_{S,D}(t)C_{S,D}(t)},$$

where $L_{S,D}(t)$ and $C_{S,D}(t)$ are the inductance and the capacitance respectively of the source and the drain coils. The coupling coefficient between the two coils is denoted as $\kappa(t)$ and is given as:

$$\kappa(t) = M(t)\sqrt{\frac{\omega_S(t)\omega_D(t)}{L_S(t)L_D(t)}},$$

where M (t) is the mutual inductance of the two coils.

Equation (1) is equivalent to the Schrödinger equation for a two-state atom written in the rotating-wave approximation, where the variables $a_S(t)$ and $a_D(t)$ are, respectively, the probability amplitudes for the ground state (equivalent to the source coil) and the excited state (equivalent to the drain coil). In the two-state atom case, the coupling coefficient (off diagonal elements in the matrix formulation) is proportional to the atomic transition dipole moment $d_{12}$ and the laser electric field amplitude E (t); i.e. $\Omega(t)=d_{12}.E(t)$. $\Omega(t)$ is known as the Rabi frequency, and parameterizes the strength of the atom-laser interaction. We define the difference between the resonant frequencies of the two coils, which corresponds to the detuning $\Delta(t)$ in the two-state atom: $\Delta(t)=\omega_S(t)-\omega_D(t)$. In the case of resonant coupling, the detuning value will be zero.

The dynamic behavior suggested by Kurz et. al is the case where the resonant frequencies of the coils are time independent, i.e. when $\omega_S(t)=\omega_S=$const and $\omega_D(t)=\omega_D=$const. In this case, only when $\omega_S=\omega_D$, which is to say when the system is at resonance, and $\Delta=0$, would there be an efficient transfer of energy between the coils. In particular, the system suffers from the fact that the power transmitted between the coils drops sharply as the system is detuned from resonance. That is to say the off-resonant case, i.e. $\omega_S(t)\neq\omega_D(t)$ is a very inefficient carrier of energy. The resonance condition may be ruined by any object which is placed between the two coils, as will be simulated hereinbelow.

The following discusses the present embodiments, and here it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1b which illustrates the concept of the RAP mechanism in which transfer of energy continues to occur even if most of the time $\omega_S \neq \omega_{D1} \neq \omega_{D2}$.

The Rapid Adiabatic Passage (RAP) Formalism

As discussed above in respect of FIG. 1a, the resonance technique is not an optimal solution for wireless energy transfer between two coils. To this end, the present embodiments provide an alternative and robust adiabatic technique, which uses time dependent dynamics instead of constant dynamics. Time dependent dynamics may be achieved by changing the resonant frequency of the source coil, and the incoming pump source, with time and/or changing the coupling coefficient between the coils. The changing of the resonant frequency, or the coupling coefficient, may be carried out in adiabatic manner, by which is meant relatively very slowly compared to the internal dynamics of the system, which is a function of the coupling coefficient. In the following is provided a systematic framework of the adiabatic criteria, in the context of wireless energy transfer.

Let us for a moment assume that the decay rates $\Gamma_S$, $\Gamma_D$ and $\Gamma_W$ are zero and let us write Eq. (1) in the so-called adiabatic basis. For the two-state atom this is the basis of the instantaneous eigenstates of the two-state Hamiltonian. Equation (1) thus modified reads as follows:

$$i\frac{d}{dt}\begin{bmatrix} b_S(t) \\ b_D(t) \end{bmatrix} = \begin{bmatrix} -\varepsilon(t) & -i\dot{\vartheta}(t) \\ i\dot{\vartheta}(t) & \varepsilon(t) \end{bmatrix}\begin{bmatrix} b_S(t) \\ b_D(t) \end{bmatrix}, \quad (2)$$

where the superimposed dot denotes a time derivative, and $\varepsilon(t)$ the rotating angle $\theta(t)$ are defined as follows:

$$\varepsilon(t) = \frac{1}{2}\sqrt{4\kappa^2(t) + (\omega_S(t) - \omega_D(t))^2},$$

$$\vartheta(t) = \frac{2\kappa(t)}{\omega_S(t) - \omega_D(t)}.$$

The connection between the amplitudes $a_S(t)$ and $a_D(t)$ in the original basis and $b_S(t)$ and $b_D(t)$ in the adiabatic basis is given by:

$b_S(t) = a_S(t)\cos\theta(t) - a_D(t)\sin\theta(t)$, $b_D(t) = a_S(t)\sin\theta(t) + a_D(t)\cos\theta(t)$.

When the evolution of the system is adiabatic there are no transitions between amplitudes $b_S(t)$ and $b_D(t)$, thus $|b_S(t)|$ and $|b_D(t)|$ remain constant. Mathematically, adiabatic evolution means that the non-diagonal terms in Eq. (2) can be neglected compared to the diagonal terms of the same equation, this holds when the following inequality is valid:

$$|\dot{\kappa}(t)\Delta(t) - \kappa(t)\dot{\Delta}(t)| \ll [4\kappa^2(t) + \Delta^2(t)]^{3/2}. \quad (3)$$

Hence, adiabatic evolution requires a smooth time dependence of the coupling $\kappa(t)$ and the detuning $\Delta(t)$, long interaction time, and large coupling and/or large detuning. If the evolution is adiabatic, then $|b_{S,D}(t)|^2 = \text{const}$. However, the energy contained in the source and the drain coil $|a_{S,D}(t)|^2$ may change if the mixing angle $\theta(t)$ changes and thus adiabatic evolution can produce energy transfer between the two coils.

If the detuning $\Delta(t)$ sweeps slowly from some large negative value, large in this context meaning larger than the coupling, to some large positive value or vice versa, then the mixing angle $\theta(t)$ rotates clockwise from $\theta(-\infty) = \pi/2$ to $\theta(\infty) = 0$.

If initially the energy is in the first coil, the system will remain adiabatically in $b_S(t)$ and thus the energy may end up in the second coil. Therefore the detuning sweep may produce complete energy transfer, a process known as rapid adiabatic passage (RAP). We emphasize that adiabatic passage in a two-state system does not depend on the sign of the detuning slope, which means that the sweep direction can be from large resonant frequencies to lower ones. Furthermore RAP is not restricted to the shape of the coupling $\kappa(t)$ and the detuning $\Delta(t)$ as far as the inequality (3) is valid and the mixing angle $\theta(t)$ changes from $\pi/2$ to 0 (or vice versa).

The special time dependence for the coupling $\kappa(t)$, for the RAP mechanism, could be easily achieved, for example, with the rotation of one, or the two coils, therefore changing the geometry and thus the mutual inductance $M(t)$ of the two coils. The variation of the detuning $\Delta(t)$, for the RAP mechanism, could be achieved by changing the capacitance, or equivalently, the inductance, of one or both of the two coils.

The above derivation is for the theoretical case of zero decay. In the realistic case when the decay rates are not zero, this does not change the essence of RAP. The nonzero decay rates may merely reduce the final energy in the second coil.

Figure 1C:
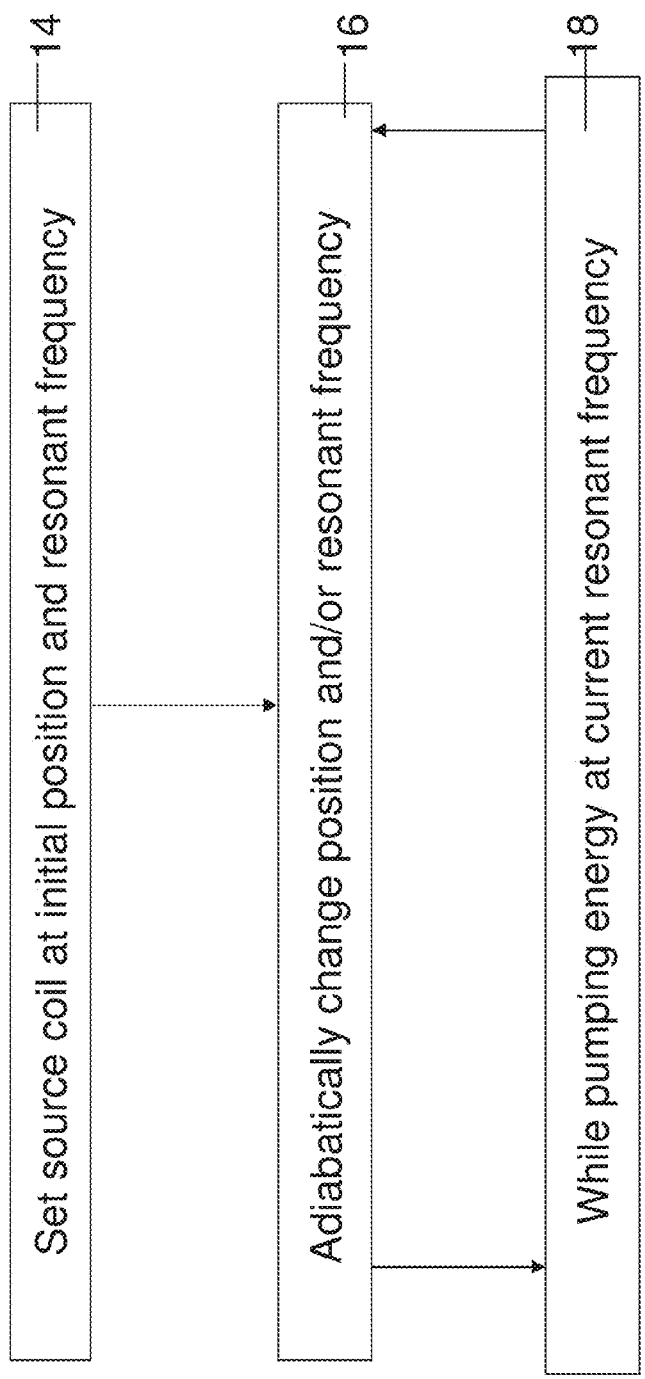
FIG. 1C is a flow chart showing a method of transferring energy between a source coil and a drain coil using an embodiment of the present invention.

FIG. 1c is a flow chart showing a method of transferring energy between a source coil and a drain coil based on the above derivation.

A source coil connected to a power supply is placed at an initial position in relation to a drain coil which is connected to a device to be powered. In step 14 the source coil begins with an initial resonant frequency. The position in which it is located relative to the drain coil provides an initial coupling coefficient for the system.

In step 16, either or both of the position and resonant frequency are changed adiabatically. At the same time, in step 18, energy is pumped into the source coil from the power supply at the current resonant frequency. The linked system between the source and drain coils transfers energy from the source to the drain coil and powers any devices attached to the drain coil. The link may be more efficient over a wider bandwidth and more robust to background noise than the prior art static resonant link, as will be explained hereinbelow.

The resonant frequency of the source coil may be changed by changing the value of a variable capacitor or a variable resistor or varying the inductance of the circuit that includes the source coil.

The coupling coefficient may be varied by changing the relative positions of the two coils. Most simply this may be achieved by rotating the source coil.

At any given time there is a detuning value between the source and drain coils. The detuning value is the difference between a current value of the resonant frequency of the source coil and the resonant frequency of the drain coil. The adiabatic changing may be a change which provides a smooth time dependence of the coupling coefficient ($\kappa(t)$) and the detuning value ($\Delta(t)$).

The coupling coefficient $\kappa(t)$ may be relatively larger than a loss rate ($\Gamma$). An initial and a final detuning value over the adiabatic cycle may both be relatively larger than the coupling coefficient. That is to say a condition is applied of $\Gamma \ll \kappa \ll \Delta$.

The adiabatic varying of the resonant frequency of the source coil may provide that the detuning value as a function of time ($\Delta(t)$) sweeps slowly from a negative value which is larger than the coupling, to a positive value also larger than the coupling.

Figure 1D:
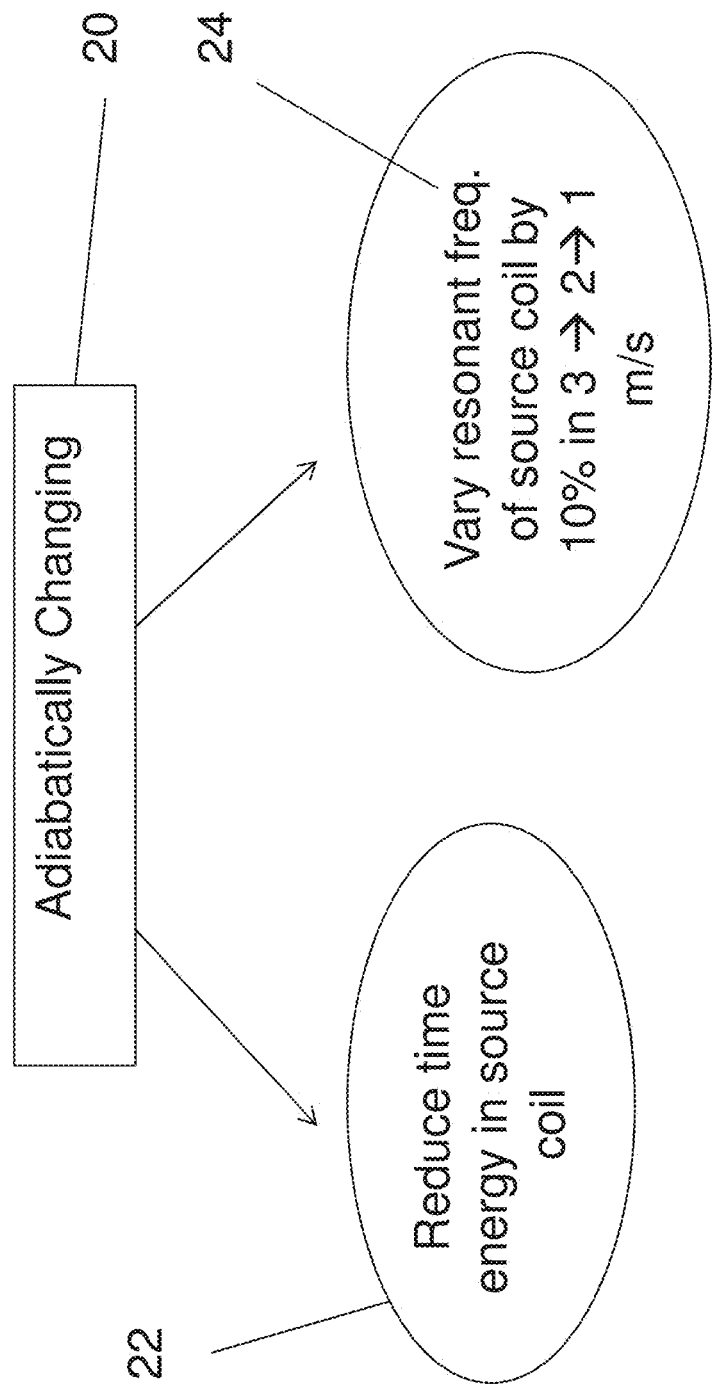
FIG. 1D is a chart showing in greater detail different possibilities for diabatic changing in FIG. 1C.

Reference is now made to FIG. 1D which shows that the adiabatic variation 20 may be to reduce an amount of time that energy is in the source coil, 22, or to vary the resonant frequency of the source coil —24— by up to 10 percent in a period of between one to three milliseconds and in particular two milliseconds.

An embodiment may comprise modifying the change to reduce an amount of time that energy is retained in the source coil.

An embodiment may involve varying the resonant frequency of the source coil by an amount of up to ten percent over a period of between one and three milliseconds.

An alternative is to vary the resonant frequency of the source coil by an amount of up to ten percent over a period exceeding two milliseconds.

In either alternative, variation may be applied to the coupling coefficient over the same period.

Reference is now made to FIG. 2, which shows a series of four graphs in which a numerical comparison between RAP and resonance mechanisms, with and without losses are shown. Graphs a) and b) show the RAP energy transfer mechanism. Graphs c) and d) show the resonance energy transfer mechanism. Graphs a) and c) illustrate the case of zero decay rate, $\Gamma_S = \Gamma_D = \Gamma_W = 0$, and graphs b) and d) illustrate non-zero decay. For the comparison we consider the following coupling and detuning for the RAP mechanism:

$$\kappa(t) = \kappa_0 \exp[-(t-\tau)^2/T^2]$$

$$\Delta(t) = \omega_S(t) - \omega_D(t) = c \cdot t - b$$

and for the resonance mechanism:

$$\kappa(t) = \kappa_0$$

$$\Delta(t) = \omega_S(t) - \omega_D(t) = 0$$

Here, the coefficients are $\kappa_0 = 5 \cdot 10^4$ s$^{-1}$, T=0, $2 \cdot 10^{-4}$ s, $\tau$=0, $67 \cdot 10^{-4}$ s, b=$20 \cdot 10^4$ s$^{-1}$, c=$30 \cdot 10^4$ s$^{-2}$.

In the comparison of FIG. 2, the dashed line refers to the source coil, and the solid line refers to the device coil.

As can be seen from FIG. 2 the energy for the resonance case oscillates back and forth between the two coils, while in the RAP case once the energy is transferred to the drain coil it stays there. This feature of RAP is used to minimize the energy losses from the source coil in the presence of decay.

The RAP process may present an advantage over the resonant case particularly when the coupling coefficient is relatively larger than the loss rate, and when the initial and final detuning is relatively larger than the coupling coefficient. Mathematically, the following may hold: $\Gamma < \kappa < \Delta$.

The Efficiency Measurement

To describe the efficiency of the present technique we use the efficiency coefficient $\eta$, which is the ratio between the work extracted from the drain for the time interval T divided by the total energy, including both absorbed and radiated, for the same time interval. Mathematically the efficiency is defined as follows:

$$\eta = \frac{\Gamma_W \int_0^T |a_D(t)|^2 dt}{\Gamma_S \int_0^T |a_S(t)|^2 dt + (\Gamma_D + \Gamma_W) \int_0^T |a_D(t)|^2 dt}. \quad (4)$$

In the resonant case where the dynamic is constant, the efficiency value may be reduced to the following efficiency value:

$$\eta = \frac{\Gamma_W |a_D|^2 T}{\Gamma_S |a_S|^2 T + (\Gamma_D + \Gamma_W)|a_D|^2 T} = \frac{\Gamma_W |a_D|^2}{\Gamma_S |a_S|^2 + (\Gamma_D + \Gamma_W)|a_D|^2}.$$

In the adiabatic dynamic, in order to maximize $\eta$, one may reduce the time that the energy stays in the source coil. This can not happen in the resonance case ($\omega_S(t) = \omega_D(t)$) because the energy oscillates back and forth between the source and the drain coils, half of the time in the source coil and half of the time in the drain coil, but we may reduce the time that the energy stays in the source coil with the RAP process.

Figure 3:
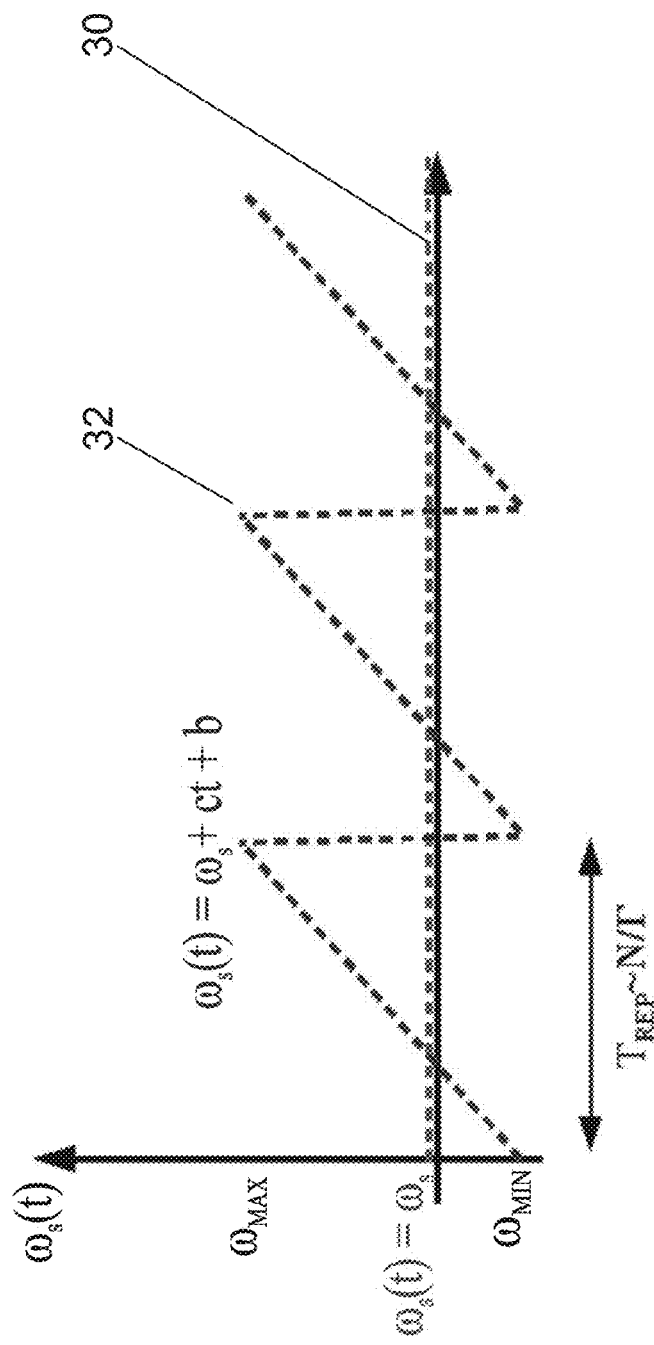
FIG. 3 is a graph illustrating a series of adiabatic sweeps of the resonant frequency with time applied to a source coil according to the present embodiments compared with a static resonant frequency according to the prior art.

Reference is now made to FIG. 3, which is a graphical illustration of the RAP dynamics with time. The RAP dynamics, or for that matter any other time varying dynamics, may repeat itself after some repetition time, defined herein as $T_{REP}$. $T_{SP}$ is of the order of several loss time intervals (equal to $1/\Gamma$), as shown in FIG. 3—TREP=N/$\Gamma$. Gamma is a factor of the energy fall—conceptually similar to the lifetime measure for radioactivity or time constants for control loops and the like, and is based on the energy dropping to 10%. As the energy in the first coil drops to 10% (as per FIG. 2) the coil is re-energized, or pumped again. That is to say the timing of the re-energizing needs to be fast enough to effectively transfer the energy but slow enough to accord with the time constants involved in the system.

FIG. 3 shows the function of the resonant frequency of the source coil. The resonant static case is shown as graph 30, and the repeated linear case, which is the simplest realization or the RAP dynamics, is shown as graph 32.

Another important measurement is the amount of energy transfer from the source coil to the device, or the useful energy consumed as a function of time. This measurement is actually equal to the nominator of the efficiency definition of Eq. (4).

Simulations

To demonstrate the advantages of the RAP process compared to the resonance process, several sets of simulations were performed, both for efficiency measurements and for total energy consumed by the device, as described below:

Comparison between efficiencies of the resonance dynamics and the RAP dynamics as a function of the detuning parameters. The comparison may be for different distances between the coils, which determine the ratio $\kappa/\Gamma$.

Influence of the variation of the coupling and loss coefficients on the efficiencies of the resonance dynamics and the RAP dynamics.

The robustness of the adiabatic energy transfer, in the case of time dependent coupling coefficient.

The robustness of the adiabatic energy transfer, in the case of arbitrary noise affecting the coupling coefficient.

Detuning Comparison

Figure 4:
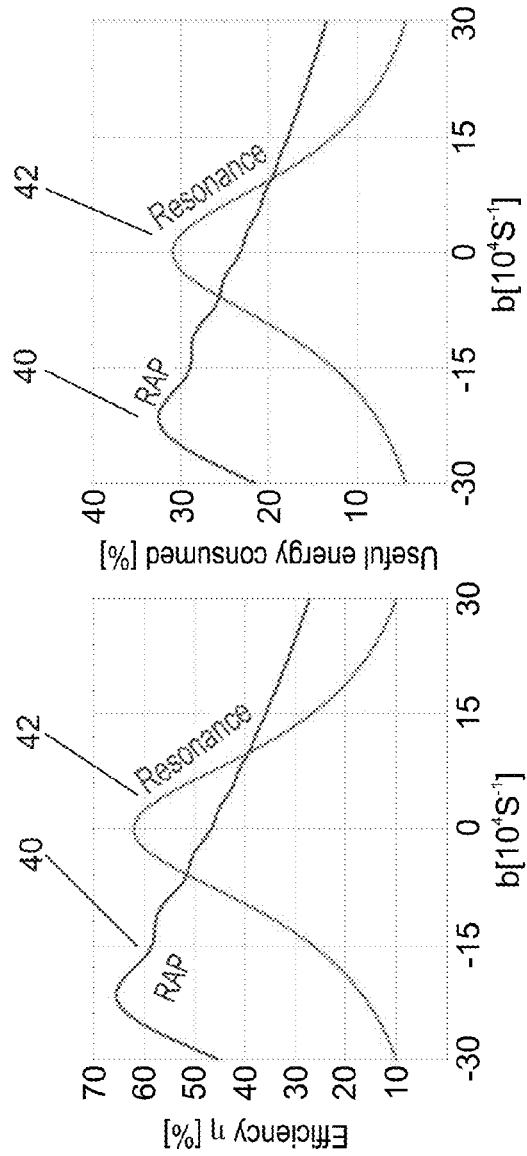
FIG. 4 shows two side by side graphs comparing efficiency and useful energy consumed respectively for a RAP system according to the present embodiments and a resonance based system, according to the prior art, both as a function of the static detuning, for a first set of coefficients.
Figure 5:
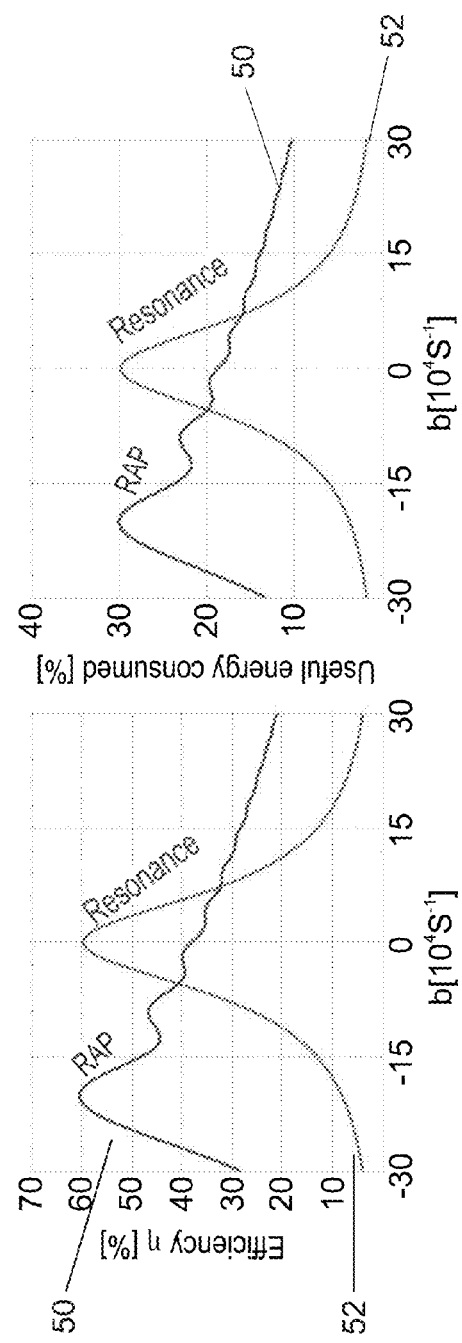
FIG. 5 shows two side by side graphs comparing efficiency and useful energy consumed respectively for a RAP system according to the present embodiments and a resonance based system, according to the prior art, both as a function of the static detuning, for a second set of coefficients.

With reference to FIG. 4 and FIG. 5, a comparison is made between the efficiency coefficient $\theta$ of the energy transfer from the source coil to the device, based on useful energy consumed, as a function of the static detuning b. Static detuning refers to the difference between the source resonant frequency and the drain resonant frequency, for the following functions of the RAP mechanism:

$$\kappa(t) = \kappa_0,$$

$$\Delta(t) = c \cdot t - b,$$

and for the resonance mechanism:

$$\kappa(t) = \kappa_0,$$

$$\Delta(t) = -b.$$

More specifically, FIG. 4 shows a comparison between the efficiency coefficient η as a function of the static detuning, FIG. 4a, and useful energy consumed as a function of the static detuning, FIG. 4b. The RAP case is line 40 and the resonance case is line 42. The numerical simulations are made for the following parameters:

$\kappa_0=5.10^4\, s^{-1}, c=30.10^4\, s^{-2}, \Gamma_W=10^4\, s^{-1}, \Gamma_S=\Gamma_D=\kappa_0/17=0{,}29.10^4\, s^{-1}$ FIG. 5 illustrates a comparison between the efficiency coefficient η as a function of the static detuning (FIG. 5a) and useful energy consumed as a function of the static detuning (FIG. 5b). The RAP case is line 50 and the resonance case is line 52. The numerical simulations are made for the following parameters:

$\kappa_0=3.10^4\, s^{-1}, c=30.10^4\, s^{-2}, \Gamma_W=10^4\, s^{-1}, \Gamma_S=\Gamma_D=\kappa_0/10=0{,}3.10^4\, s^{-1}$ As can be seen from FIG. 4 and FIG. 5, RAP has an advantage because the maximum efficiency coefficient η for the RAP case is high compared to the resonance case and also RAP is far more insensitive to static detuning b. The maximum for the resonance case is symmetric about the positive and negative static detuning while the RAP case is not symmetric and the maximum is shifted toward the negative detuning. An explanation is that energy transfer occurs at an early stage and therefore the energy state is held for less time in the source coil.

The parameters in FIG. 4 and FIG. 5 are chosen in such a way as to correspond to distances between the coils of 1 m and 1.25 m respectively.

Variation of the Coupling and Loss Coefficients

Figures 6, 7:
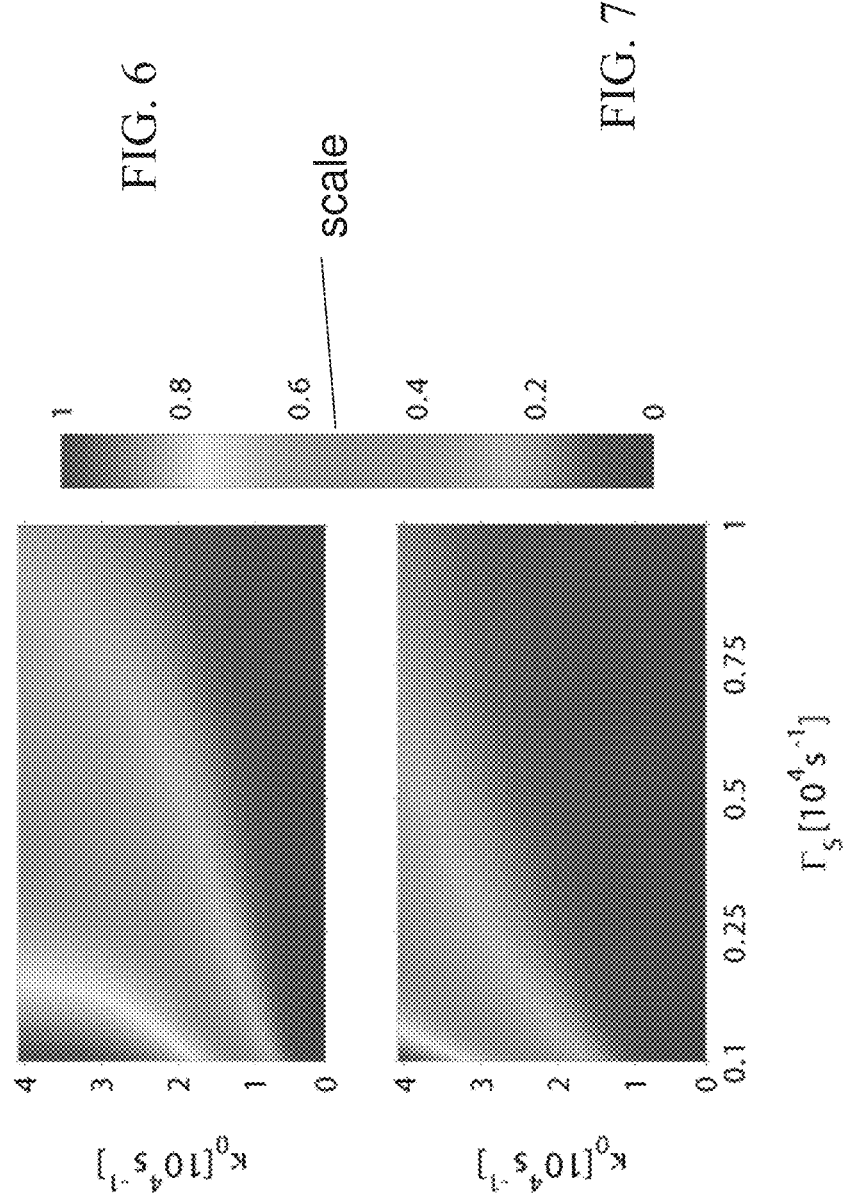

FIGS. 6, 7, 8a and 8b show contour plots of the efficiency coefficient η as a function of the coupling $\kappa_0$ and the decay rate of the source and the drain coils $\Gamma_D=\Gamma_S$. Referring first of all to FIG. 6, results are shown for the RAP mechanism with the following time dependence of the coupling and the detuning:

$\kappa(t)=\kappa_0,$ $\Delta(t)=c \cdot t - b,$

FIG. 7 illustrates the resonance mechanism with the following time dependence of the coupling and the detuning:

$\kappa(t)=\kappa_0,$ $\Delta(t)=-b.$

FIGS. 6 and 7 are contour plots of the efficiency coefficient η for the RAP case (top frame) and the resonance case (bottom frame), for the following parameters:

$c=30.10^4\, s^{-2}, b=20.10^4\, s^{-1}, \Gamma_D=\Gamma_S, \Gamma_W=10^4\, s^{-1}$ Reference is now made to FIG. 8, which illustrates a contour plot of the efficiency coefficient η for the RAP case, FIG. 8a, and the resonance case, FIG. 8b, for parameters:

$c=30.10^4\, s^{-2}, b=10.10^4\, s^{-1}, \Gamma_D=\Gamma_S, \Gamma_W=10^4\, s^{-1}$ It is apparent from the contour plots that RAP is more robust to the change of parameters compare to the resonance mechanism.

Time Dependent Coupling Comparison

A more realistic situation for simulation is the case in which, when changing the detuning between the coils the coupling is also changed. This can be seen from the following formula:

$$\kappa(t) = M(t)\sqrt{\frac{\omega_S(t)\omega_D(t)}{L_S(t)L_D(t)}},$$

The maximum of the coupling is expected to be when the detuning is zero. Therefore we provide simulations with a coupling and a detuning that comprise the following functions of time:

$\Delta(t)=c \cdot t - b$ $\kappa(t)=\kappa_0-\sqrt{|\Delta(t)|}=\kappa_0-\sqrt{|c \cdot t - b|},$ (5)

Figures 9A, 9B:
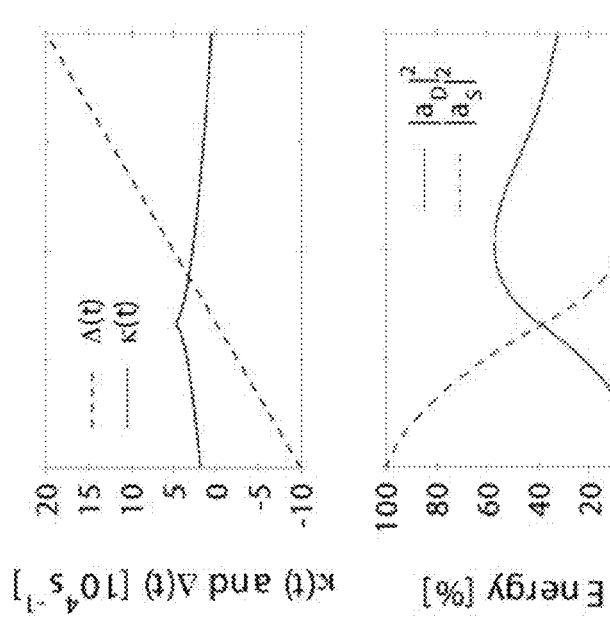
FIG. 9A shows simulation results in which coupling and detuning are plotted as a function of time according to an embodiment of the present invention.
FIG. 9B shows results of the same simulation as FIG. 9A in which energy transfer between the coils is plotted as a function of time.

Referring now to FIG. 9, energy transfer is plotted as a function of time and the detuning and coupling are likewise shown as a function of time. The simulation is carried out for the same parameters as for the previous simulation, namely $\kappa_0=5.10^4\, s^{-1}, b=20.10^4\, s^{-1}, c=30.10^4\, s^{-2},$
$\Gamma_S=\Gamma_D=\Gamma_W=0{,}3.10^4\, s^{-1}$ FIG. 9a illustrates the RAP case coupling and detuning as a function of time (from equation (5)) and FIG. 9b shows energy transfer as a function of time.

Figure 10:
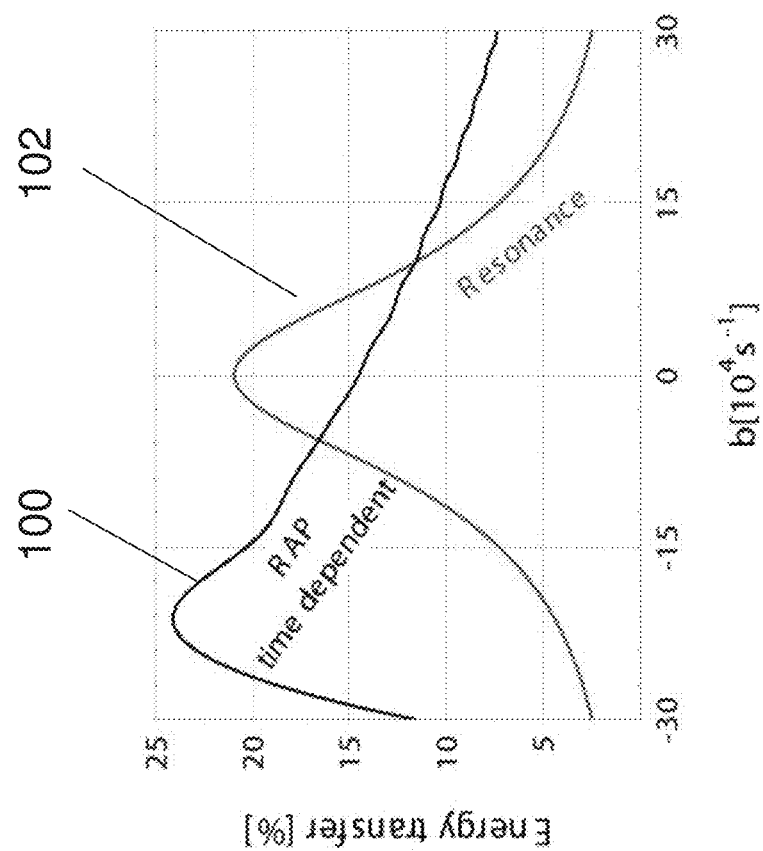
FIG. 10 is a simplified plot in which energy transfer percent is plotted against the static detuning in a simulation according to an embodiment of the present invention.

Reference is now made to FIG. 10, which illustrates energy transfer as a function of the static detuning. Comparison is shown between the time dependent RAP case 100 and the resonance case 102. The parameters used in the simulation of FIG. 10 are:

$\kappa_0=5.10^4\, s^{-1}, c=30.10^4\, s^{-2}, \Gamma_W=\kappa_0/10=0{,}5.10^4\, s^{-1},$
$\Gamma_S=\Gamma_D=\kappa_0/15=0{,}3.10^4\, s^{-1}$ Noise Robustness The comparison between the RAP mechanism and resonance mechanism is made for the useful energy consumed as a function of time. For the simulation we induce 10% noise in the static detuning and in the coupling, so the RAP has the following time dependence of the coupling and detuning:

$\kappa(t)=(5.10^4 \pm 5.10^3)s^{-1},$ $\Delta(t)=30.10^4\, s^{-2} \cdot t-(30.10^4 \pm 3.10^4)s^{-1},$ and for the resonance case:

$\kappa(t)=(5.10^4 \pm 5.10^3)s^{-1},$ $\Delta(t)=\pm 3.10^4\, s^{-1}.$

Figure 11:
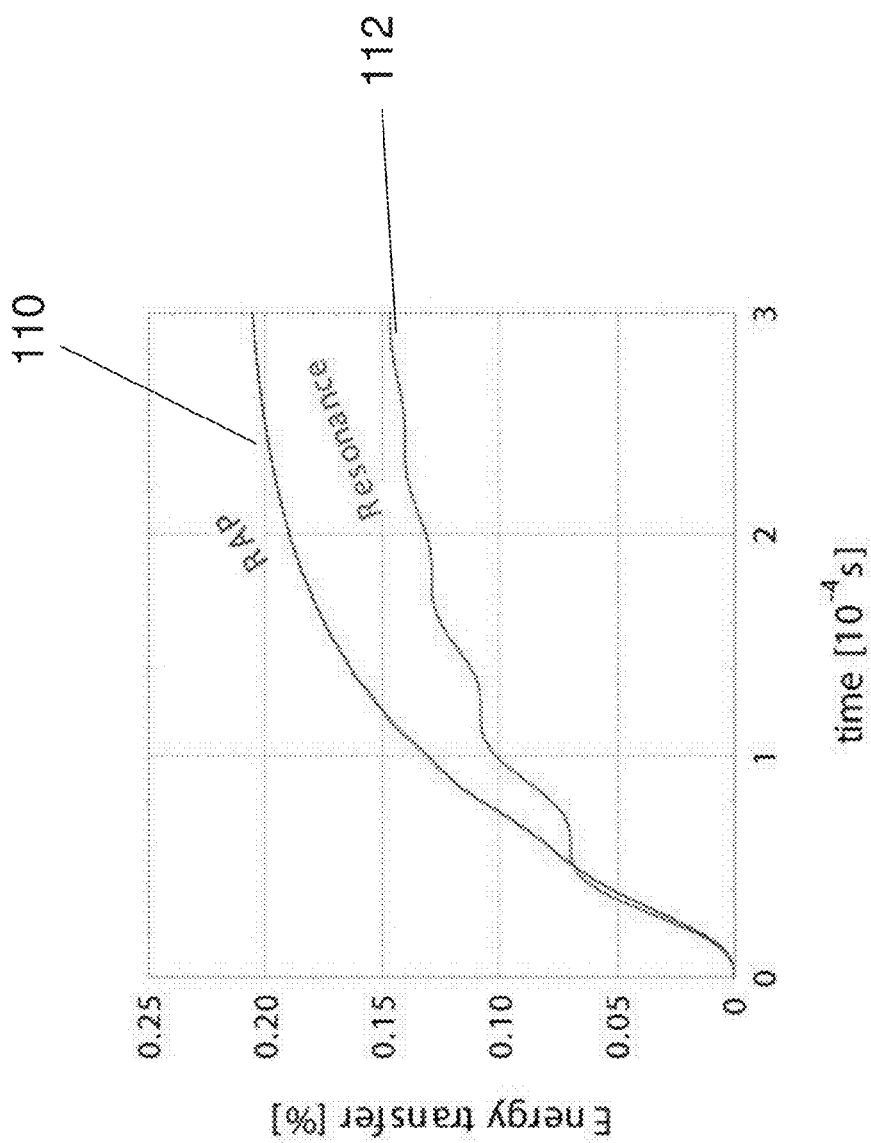
FIG. 11 is a plot showing energy transfer as a function of time for another simulation according to the present embodiments.

With reference now to FIG. 11, it is seen that RAP efficiency is better than the resonance case.

Figure 12:
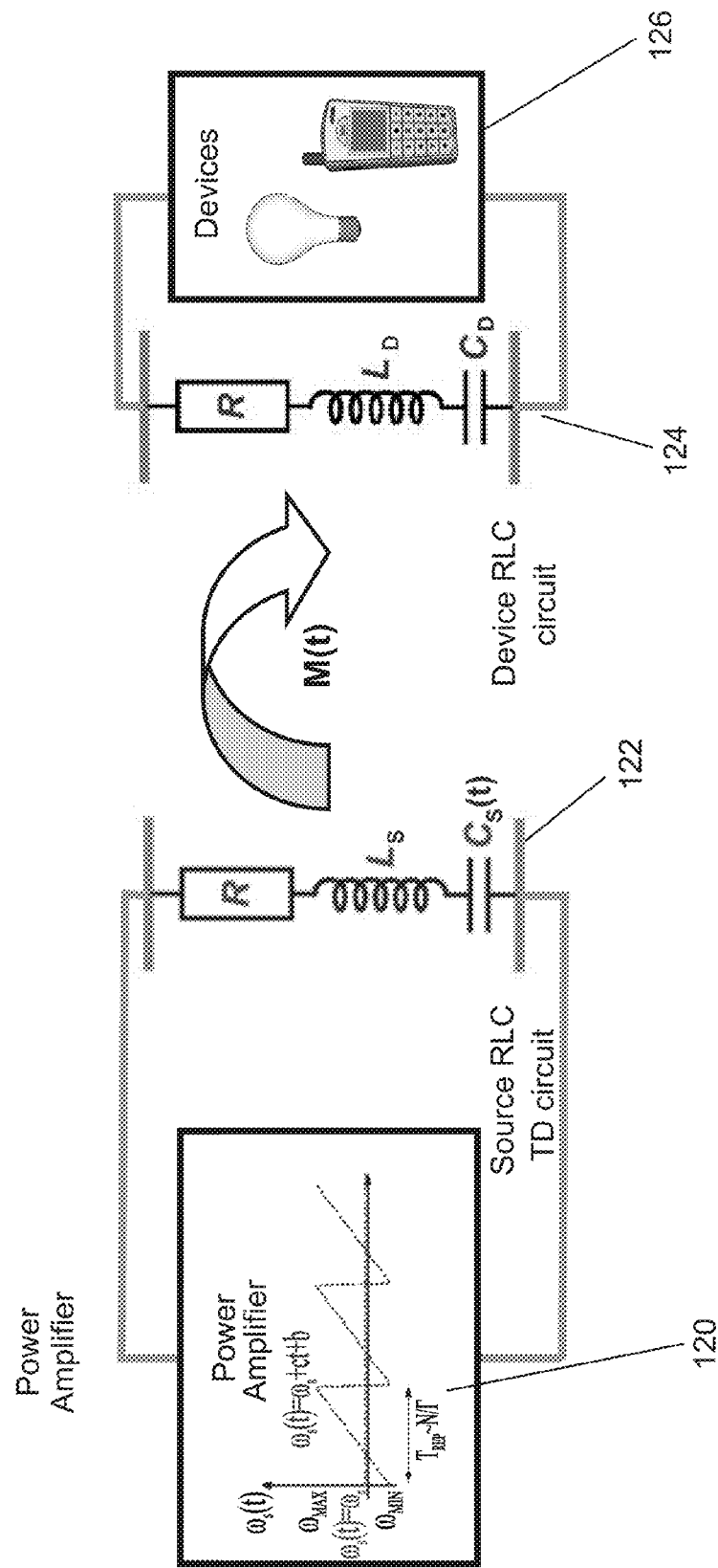
FIG. 12 illustrates a prototype embodiment of the present invention on which the results shown in table 1 were obtained.

Specifically, FIG. 11 shows energy transfer as a function of time for the RAP case 110 and the resonance case 112. The decay rates used in the simulation of FIG. 11 are:

$\Gamma_W=\kappa_0/10=0{,}5.10^4\, s^{-1}, \Gamma_S=\Gamma_D=\kappa_0/15=0{,}3.10^4\, s^{-1}$ Implementation of the Adiabatic Wireless Energy Transfer Reference is now made to FIG. 12 which illustrates an implementation of the adiabatic wireless energy transfer, for carrying out adiabatic wireless energy transfer.

A power amplifier 120 is a power source and provides a sawtooth output at a given frequency in accordance with FIG. 3 above that provides an adiabatic effect. The power is provided to an RLC circuit 122 which is inductively coupled with mutual inductance M to a device RLC circuit 124. Device RLC circuit is connected to device 126 which it is desired to power from power source 120.

The exact analysis of the capacitance, inductance and the loss of the system illustrated may be carried out by numerically solving Maxwell's equations. In special designs there are approximate estimates of those parameters using formulas presented hereinbelow. One of the approximate solutions for the inductance measurement is the wire loop coil with N turns, which may be used in the present analysis. Nevertheless, other types of coils and geometry may be used instead, the requirement being for the generation of two coupled RLC circuits.

The resonant frequency of a coil is defined as (in case of negligible loss):

$$\omega_0 = \sqrt{\frac{1}{LC}}$$

where L is the inductance of the coil, $C=C_{in}+C_p$ is the equivalent parallel capacitance of the coil, where $C_{in}$ is the self capacitance and $C_p$ is the parasitic capacitance.

In the case of the presence of loss (damping), one can express the damped resonance frequency in terms of the undamped resonance frequency and the damping factor.

$$\omega_d = \sqrt{\frac{1}{LC} - \frac{R}{2L}}$$

The quality factor of a coil (series RLC circuit) is defined as:

$$Q = \frac{1}{R_{ohm} + R_{rad}} \sqrt{\frac{L}{C}}$$

where, Rohm and Rrad are the ohmic loss inside the wire and the radiation resistance (i.e. the energy that is radiated), respectively.

We may use in our analysis an approximate solution of the impedance of the wire loop coil with N turns, and a radius r conducting wire with circular cross section of radius a, surrounded by air. The impedance can be calculated as:

$$L = \mu_0 N^2 r \left[ \ln\left(\frac{8r}{a}\right) - 2 \right]$$

The magnetic coupling between the coils and therefore the energy transfer efficiency decreases significantly as the coil sizes shrink, due to the almost linear relationship between the area of the transmitting and receiving coils and the mutual coupling between two coils, M, approximated as $$M = \frac{\pi}{4} \mu_0 N_1 N_2 \frac{(r_1 r_2)^2}{D^3}$$

In case of constant dynamics, those equations are enough to determine the efficiency of the wireless energy transfer. We may examine the relevant numbers in the case of a time dependent design.

There are several ways to implement time dependency of the resonant frequency: one can change each one or more of the variables: capacitance, resistance and inductance. In the following we examine only the first two, namely we provide variation in capacitance and resistance. However the skilled person will have no difficulty in providing variation in impedance, which is connected to the geometry and size of the device.

We vary the source resonance in a linear fashion, from negative detuning to positive detuning (or vice versa), where we define α as the sweep rate and b as a constant detuning. Mathematically it is defined as:

$$\omega_s(t) = \omega_0 + \frac{d\omega}{dt} t + \omega_b = \omega_s + \alpha t + \omega_b$$

We begin with the case of capacitance variation, in the case of an undamped or weakly damped circuit. Here, in order to change the resonant frequency in a linear manner, we may change the capacitance using the following relationship:

$$C = C_{in} + C_p$$

$$= \frac{1}{\omega^2 L} \Rightarrow C_p(t)$$

$$= \frac{1}{(\omega_t)^2 L} - C_{in}$$

$$= \frac{1}{(\omega_s + \alpha t + \omega_b)^2 L} - C_{in}$$

In order to fulfill the requirements of a rapid adiabatic scheme and constraint we may also vary the $\omega_{MIN}$ and $\omega_{MAX}$ values, which are the minimal and maximal frequencies of a frequency sweep. Also we may write $T_{REP}$, which is the repetition time of each cycle (which should be of the order of 1/Γ).

Table 1 below gives some numerical examples of adiabatic energy transfer carried out using the apparatus of FIG. 12, showing dimensions, frequencies used, and the capacitance which was varied during the course of each experiment.

TABLE 1

Numerical Examples of Adiabatic Energy Transfer

| a [mm] | N | r [cm] | L [mH] | $\omega_0$ [Hz] | α [Hz/sec] | $\omega_b$ [Hz] | $\omega_{MIN}$ [Hz] | $\omega_{MAX}$ [Hz] | $T_{REP}$ [ms] | $C_p$ [pF] |
|---|---|---|---|---|---|---|---|---|---|---|
| 0.36 | 12 | 6 | 31 | $10^7$ | $230 \cdot 10^6$ | $-2 \cdot 10^6$ | $9.5 \cdot 10^6$ | $10.2 \cdot 10^6$ | 3 | 3.1-3.5 |
| 1.2 | 6 | 12 | 13 | $10^7$ | $230 \cdot 10^6$ | $-2 \cdot 10^6$ | $9.5 \cdot 10^6$ | $10.2 \cdot 10^6$ | 3 | 7.4-8.5 |
| 1 | 10 | 10 | 30 | $10^7$ | $230 \cdot 10^6$ | $-2 \cdot 10^6$ | $9.5 \cdot 10^6$ | $10.2 \cdot 10^6$ | 3 | 3.2-3.7 |
| 0.36 | 12 | 6 | 31 | $10^6$ | $23 \cdot 10^6$ | $-2 \cdot 10^5$ | $9.5 \cdot 10^5$ | $10.2 \cdot 10^5$ | 3 | 310-350 |
| 1.2 | 6 | 12 | 13 | $10^6$ | $23 \cdot 10^6$ | $-2 \cdot 10^5$ | $9.5 \cdot 10^5$ | $10.2 \cdot 10^5$ | 3 | 740-850 |
| 1 | 10 | 10 | 30 | $10^6$ | $23 \cdot 10^6$ | $-2 \cdot 10^5$ | $9.5 \cdot 10^6$ | $10.2 \cdot 10^6$ | 3 | 320-370 |

Figure 13:
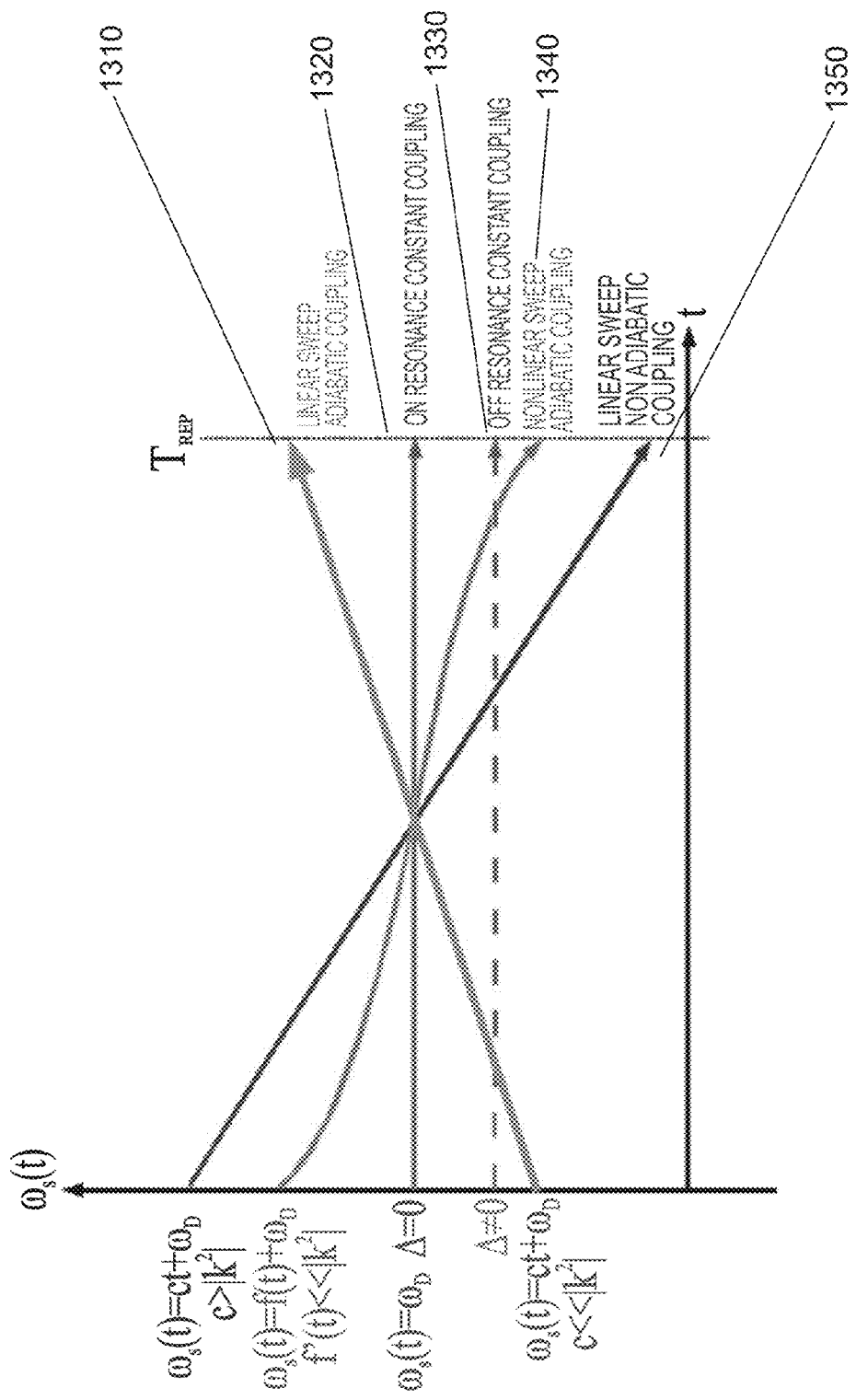
FIG. 13 is a comparative graph showing dynamics of different coupling techniques according to the present embodiments and according to the prior art.

Reference is now made to FIG. 13, which is a comparative graph of $\omega_S$ against time for different energy transfer regimes.

Curves shown are 1310 linear sweep adiabatic coupling, 1320 on resonance constant coupling, 1330 off resonance constant coupling, 1340 non-linear sweep adiabatic coupling and 1350 linear sweep non-adiabatic coupling.

It will be noted that at time $t=T_{REP}$, linear sweep adiabatic coupling, which is shown above in FIG. 3 is more efficient than resonant coupling. On resonance and off resonance constant coupling are prior art methods of which on resonance constant coupling gives good efficiency, but with the proviso of staying on resonance.

It is noted that for the linear sweep case 1310, c is much smaller than kappa. The linear sweep non-adiabatic case 1350 is robust but not very efficient.

Finally the non linear sweep adiabatic coupling 1340 may be the optimal sweep function. The function may still be adiabatic in that it fulfils the condition set by equation 3 above and it may be more optimal than the linear case.

Figure 14:
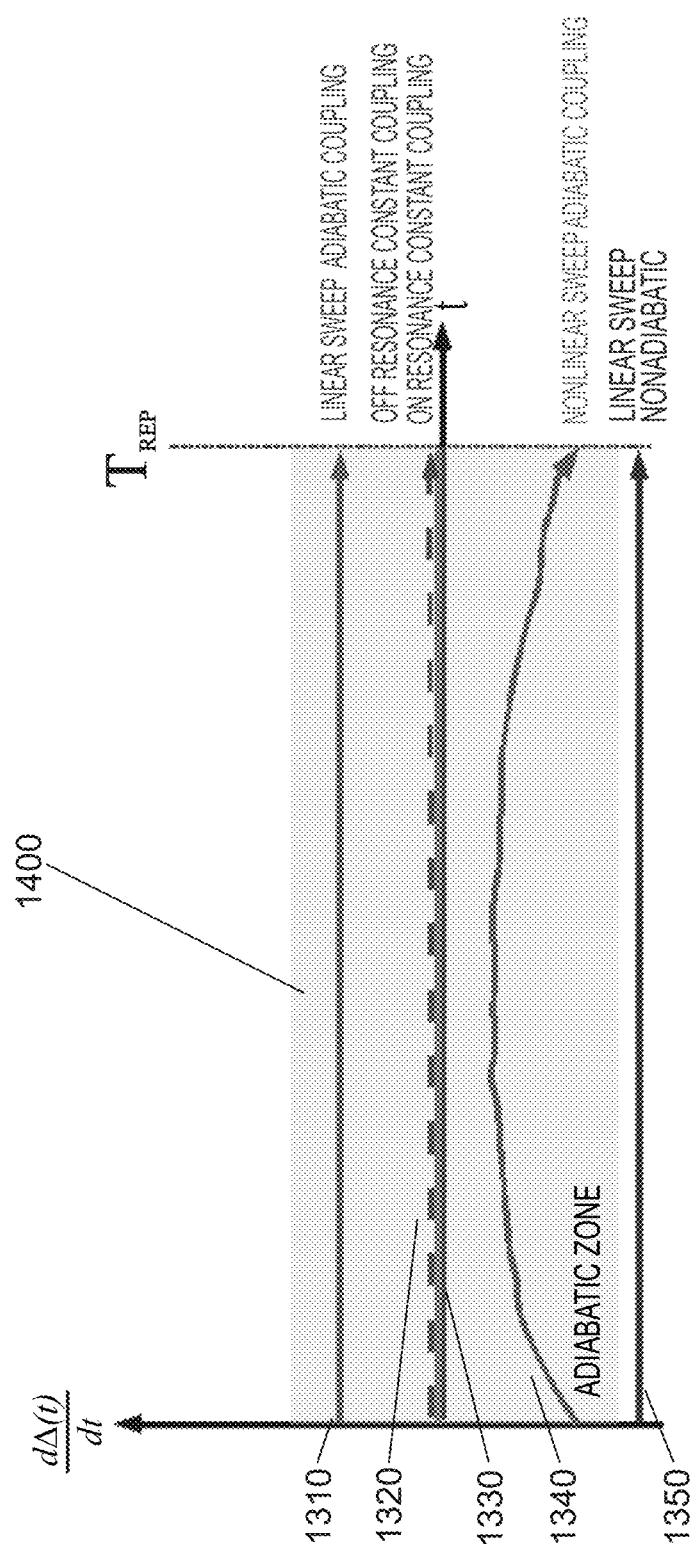
FIG. 14 is a graph showing the differentials of the different coupling technique dynamics of FIG. 13.

FIG. 14 is the differential of FIG. 13. The constant coupling cases 1320, resonant, and 1330, non-resonant, both sit at the zero level. The linear adiabatic case 1310 has a differential which is linear and non-zero. The non-linear sweep adiabatic case 1340 is non-linear but within a zone 1400 defined by equation 3 which may be termed the adiabatic zone. The linear sweep non-adiabatic case 1350 has a linear differential, but the differential is outside the adiabatic zone 1400.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of transferring energy between a source coil and a drain coil, comprising:
    setting an initial resonant frequency of said source coil as a first condition;
    setting said source coil and said drain coil in positions relative to each other to define an initial coupling coefficient therebetween, said initial coupling coefficient defining a second condition; and
    adiabatically changing at least one member of the group consisting of a value of said first condition and a value of said second condition while pumping energy into said source coil, thereby to transfer said pumped energy to said drain coil; and
    varying said resonant frequency of said source coil by an amount of up to ten percent over a period of between one and three milliseconds.

2. The method of transferring energy of claim 1, wherein both of said first condition and said second condition are adiabatically changed.

3. The method of transferring energy of claim 1, wherein said first condition is adiabatically changed.

4. The method of transferring energy of claim 1, wherein said second condition is adiabatically changed.

5. The method of transferring energy of claim 1, wherein said source coil is part of a resonant circuit having variable components to allow said initial resonant frequency to be changed.

6. The method of transferring energy of claim 1, wherein said source and drain coils are mobile with respect to each other, thereby to allow changing of said initial coupling coefficient.

7. A method of transferring energy between a source coil and a drain coil, comprising:
    setting an initial resonant frequency of said source coil as a first condition;
    setting said source coil and said drain coil in positions relative to each other to define an initial coupling coefficient therebetween, said initial coupling coefficient defining a second condition; and
    adiabatically changing at least one member of the group consisting of a value of said first condition and a value of said second condition while pumping energy into said source coil, thereby to transfer said pumped energy to said drain coil;
    wherein both of said first condition and said second condition are adiabatically changed, and wherein at any given time of said adiabatic changing there is a detuning value, said detuning value being the difference between a current value of the resonant frequency of the source coil and the resonant frequency of the drain coil, said adiabatic changing providing a smooth time dependence of the coupling coefficient ($\kappa(t)$) and the detuning value ($\Delta(t)$).

8. The method of transferring energy of claim 7, wherein said adiabatic changing comprises fulfilling an adiabatic condition relating said coupling coefficient and said detuning value:

$$|\dot{\kappa}(t)\Delta(t)-\kappa(t)\dot{\Delta}(t)|<<[4\kappa^2(t)+\Delta^2(t)]^{3/2}.$$

9. The method of transferring energy of claim 7, wherein the coupling coefficient $\kappa(t)$ is relatively larger than a loss rate ($\Gamma$), and wherein an initial and a final detuning are both relatively larger than the coupling coefficient, ($\Gamma<\kappa<\Delta$).

10. A method of transferring energy between a source coil and a drain coil, comprising:
    setting an initial resonant frequency of said source coil as a first condition;
    setting said source coil and said drain coil in positions relative to each other to define an initial coupling coefficient therebetween, said initial coupling coefficient defining a second condition; and
    adiabatically changing at least one member of the group consisting of a value of said first condition and a value of said second condition while pumping energy into said source coil, thereby to transfer said pumped energy to said drain coil; the method further comprising varying the resonant frequency of the source coil such that a detuning value ($\Delta(t)$), said detuning value being a difference between the resonant frequency of the source coil and the resonant frequency of the drain coil, sweeps slowly from a negative value, said negative value being larger than the coupling between said source coil and said drain coil, to a positive value being larger than said coupling between said source coil and said drain coil.

11. A method of transferring energy between a source coil and a drain coil, comprising:
setting an initial resonant frequency of said source coil as a first condition;
setting said source coil and said drain coil in positions relative toe ach other to define an initial coupling coefficient therebetween, said initial coupling coefficient defining a second condition; and
adiabatically changing at least one member of the group consisting of a value of said first condition and a value of said second condition while pumping energy into said source coil, thereby to transfer said pumped energy to said drain coil; the method further comprising modifying said changing to reduce an amount of time that energy is retained in said source coil.

12. A method of transferring energy between a source coil and a drain coil, comprising:
setting an initial resonant frequency of said source coil as a first condition;
setting said source coil and said drain coil in positions relative toe ach other to define an initial coupling coefficient therebetween, said initial coupling coefficient defining a second condition; and
adiabatically changing at least one member of the group consisting of a value of said first condition and a value of said second condition while pumping energy into said source coil, thereby to transfer said pumped energy to said drain coil; the method further comprising varying said resonant frequency of said source coil by an amount of up to ten percent over a period exceeding two milliseconds.

13. The method of claim 12, further comprising varying said coupling coefficient over said period.

14. Apparatus for transferring energy comprising:
a source coil having resonance variation circuitry for varying a resonant frequency of said source coil;
a position unit for varying a position or orientation of said source coil so as to vary a coupling coefficient of said source coil with a respective drain coil to which said source coil is wirelessly coupled;
and a controller configured to adiabatically vary at least one of said resonant frequency and said coupling coefficient while pumping energy into said source coil, thereby to transfer said pumped energy to said drain coil wherein said controller is configured to vary the resonant frequency of the source coil such that a detuning value ($\Delta(t)$), said detuning value being a difference between the resonant frequency of the source coil and the resonant frequency of the drain coil, sweeps slowly from a negative value, said negative value being larger than the coupling between said source coil and said drain coil, to a positive value being larger than said coupling between said source coil and said drain coil.

15. The apparatus of claim 14, wherein both of said resonant frequency and said coupling coefficient are adiabatically changed.

16. The apparatus of transferring energy of claim 14, wherein said resonant frequency is adiabatically changed.

17. The apparatus of claim 14, wherein said coupling coefficient is adiabatically changed.

18. The apparatus of claim 14, wherein said locating unit is operative to rotate said source coil, thereby to allow said adiabatic changing of said initial coupling coefficient.

19. Apparatus for transferring energy comprising:
a source coil having resonance variation circuitry for varying a resonant frequency of said source coil;
a position unit for varying a position or orientation of said source coil so as to vary a coupling coefficient of said source coil with a respective drain coil to which said source coil is wirelessly coupled;
and a controller configured to adiabatically vary at least one of said resonant frequency and said coupling coefficient while pumping energy into said source coil, thereby to transfer said pumped energy to said drain coil, wherein at any given time of said adiabatic changing there is a detuning value, said detuning value being the difference between a current value of the resonant frequency of the source coil and the resonant frequency of the drain coil, said adiabatic changing providing a smooth time dependence of the coupling coefficient ($\kappa(t)$) and the detuning value ($\Delta(t)$).

20. The apparatus of claim 19, wherein the coupling coefficient $\kappa(t)$ is relatively larger than a loss rate ($\Gamma$), and wherein an initial and a final detuning are both relatively larger than the coupling coefficient, ($\Gamma < \kappa < \Delta$).

21. The apparatus of claim 14, wherein said controller is operative to modifying said changing to reduce an amount of time that energy is retained in said source coil.

22. The apparatus of claim 14, wherein said controller is operative to vary said resonant frequency of said source coil by an amount of up to ten percent over a period of between one and three milliseconds.

23. The apparatus of claim 14, wherein said controller is operative to vary said resonant frequency of said source coil by an amount of up to ten percent over a period exceeding two milliseconds.

24. The apparatus of claim 23, wherein said controller is operative to vary said coupling coefficient over said period.

* * * * *